Nov. 24, 1953    J. E. WILSKE ET AL    2,660,432
APPARATUS FOR CONVEYING AND STACKING BOX BLANKS
Filed Sept. 4, 1948    7 Sheets-Sheet 1

Inventors
J.E. WILSKE
F.A. McCORMICK
V.G. POLITSCH
By Reele and Hoge
Attorneys

Nov. 24, 1953    J. E. WILSKE ET AL    2,660,432
APPARATUS FOR CONVEYING AND STACKING BOX BLANKS
Filed Sept. 4, 1948    7 Sheets-Sheet 3

Inventors
J. E. WILSKE
F. A. McCORMICK
V. G. POLITSCH

By Rule and Hoge,
Attorneys

Nov. 24, 1953  J. E. WILSKE ET AL  2,660,432
APPARATUS FOR CONVEYING AND STACKING BOX BLANKS
Filed Sept. 4, 1948  7 Sheets-Sheet 5

Inventors
J.E. WILSKE
F.A. McCORMICK
V.G. POLITSCH
By Rule & Hoge
Attorneys

Inventors
J. E. WILSKE
F. A. McCORMICK
V. G. POLITSCH

By Rule and Hoge
Attorneys

Patented Nov. 24, 1953

2,660,432

UNITED STATES PATENT OFFICE 2,660,432

APPARATUS FOR CONVEYING AND STACKING BOX BLANKS

Julius E. Wilske, Francis A. McCormick, and Verney G. Politsch, Alton, Ill., assignors to Owens-Illinois Glass Company, a corporation of Ohio Application September 4, 1948, Serial No. 47,774

7 Claims. (Cl. 271—68)

Our invention relates to apparatus for receiving blanks of sheet material and conveying, elevating and stacking them. The apparatus as herein illustrated is designed for receiving flat blanks, foldable for making boxes or cartons, conveying and elevating the blanks and stacking them, and will be described as used for such purposes. It will be understood that the invention is not limited to such use.

Our invention provides an apparatus for receiving the box blanks in flat form from a printing and slotting machine, and stacking the blanks on a truck or the like. In its preferred form it comprises a horizontally disposed travelling belt conveyor arranged to receive the blanks, an elevating belt conveyor onto which the blanks are discharged from the receiving conveyor, the elevating conveyor frame being mounted to swing upwardly from a lowered position in which it is substantially horizontal to an upwardly inclined position, thereby gradually lifting the discharge end as the stack of blanks increases in height, and means for then returning the conveyor to its lowered position preparatory to building a succeeding stack of blanks.

An object of the invention is to provide means by which the elevating conveyor is hoisted and lowered automatically combined with manual control devices by which the various operations of the receiving and elevating conveyors are under the control of the operator.

A further object of the invention is to provide automatic means by which the receiving conveyor is run at a comparatively slow speed while the elevating conveyor is being lowered and then at a comparatively high speed during the stacking of the blanks.

A still further object of the invention is to provide manually controlled means by which the elevating conveyor may be inched up or down by the operator for adjusting the height of the discharge end of the conveyor to correspond with the height of the stack at the time of such adjustment.

Other objects of the invention will appear hereinafter.

Referring to the accompanying drawings.

Figures 1, 2:
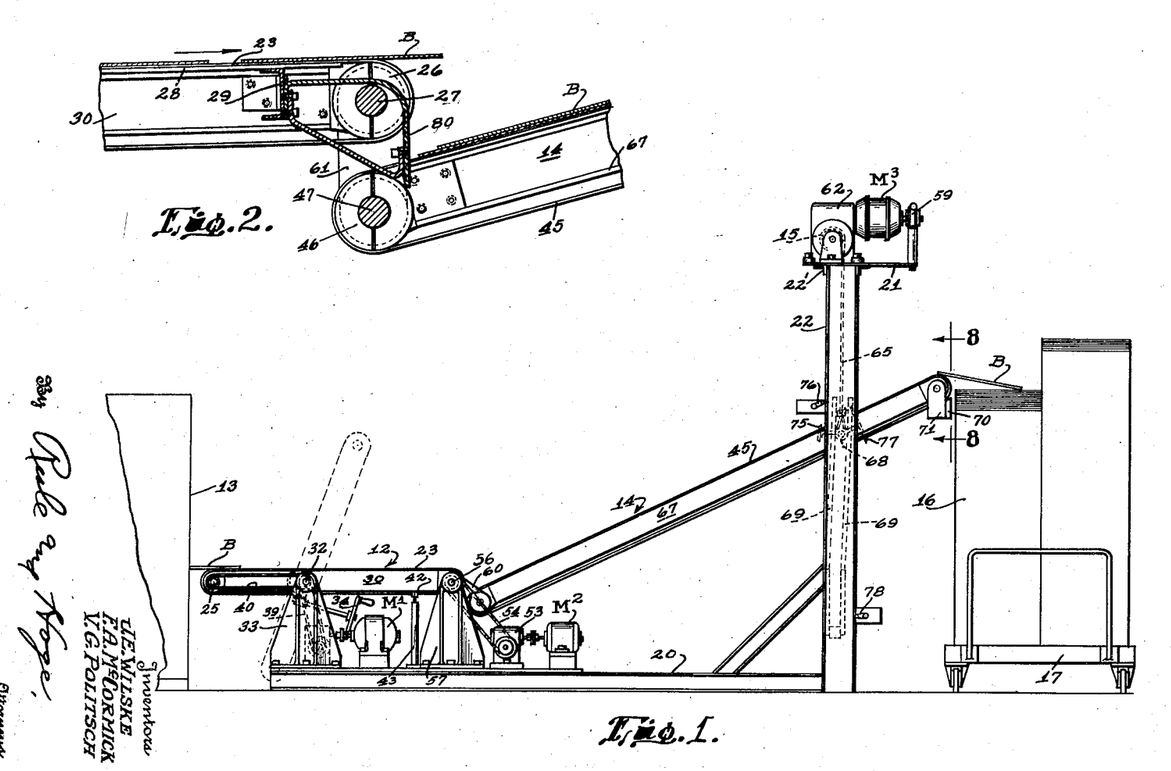
Fig. 1 is a side elevation of an apparatus embodying our invention.
Fig. 2 is a fragmentary sectional view at the line 2—2 on Fig. 3, showing adjacent end portions of the receiving and elevating conveyors.

Referring to Fig. 1, the invention comprises, in general terms, a horizontal endless belt conveyor 12, herein referred to as the receiving conveyor, receiving blanks B from a printing and slotting machine 13, a motor $M^1$ which drives the receiving conveyor, an elevating conveyor 14 which receives the blanks from the conveyor 12, a motor $M^2$ for driving the elevating conveyor, a hoisting motor $M^3$ geared to hoisting drums 15 and operating intermittently for lifting the discharge end of the conveyor 14 step by step as the stack 16 of blanks is built up, and then lowering the elevating conveyor preparatory to building a succeeding stack of blanks. The blanks as shown are stacked on a truck 17. Automatic control devices are provided for reversing the hoisting motor when the conveyor 14 reaches its upper and lower limits, stopping the travel of the elevating conveyor belts and reducing the speed of the receiving conveyor during the lowering of the elevating conveyor, all as set forth hereinafter.

Figure 3:
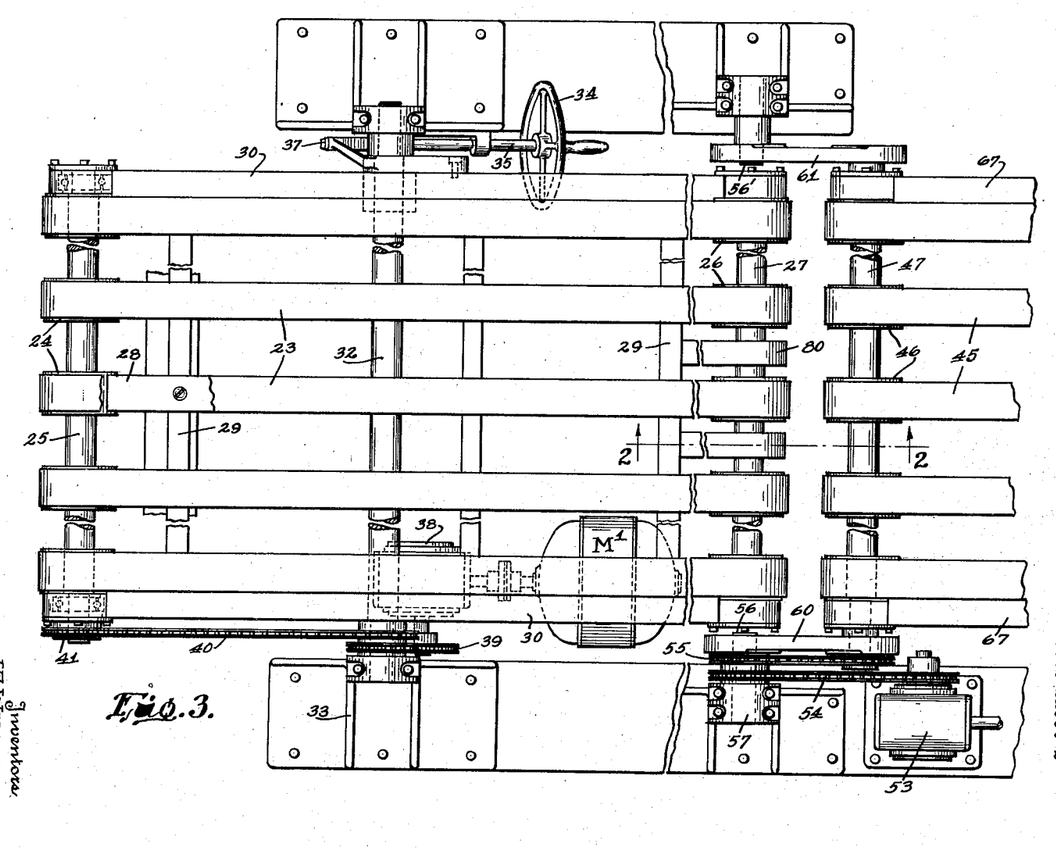
Fig. 3 is a plain view of the apparatus, parts being broken away.
Figure 4:
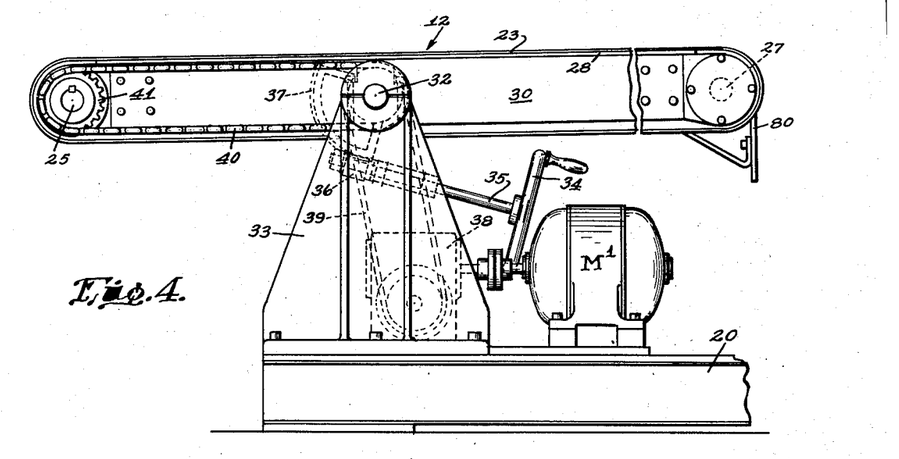
Fig. 4 is an elevation of the receiving conveyor and its driving motor.
Figure 5:
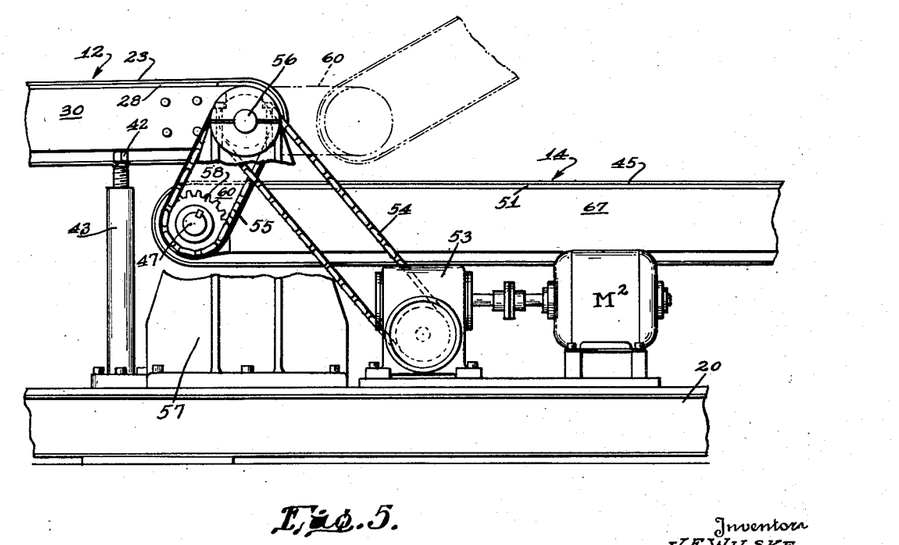
Fig. 5 is a fragmentary elevational view showing the adjacent end portions of the receiving and elevating conveyors and the driving motor for the elevating conveyor.

The receiving and elevating conveyors and their motors are mounted on a horizontal base or framework 20. The hoisting mechanism is mounted on a platform 21 supported on an upright frame comprising vertical channel-iron frame members 22 and cross-bars 22'. The receiving conveyor 12 comprises a plurality of horizontally spaced endless conveyor belts 23 (Figs. 3, 4 and 5), trained over pulleys 24 on a driving shaft 25, and pulleys 26 on a driven shaft 27. The belts are supported on sheet metal strips 28 mounted on cross channel-irons 29 attached to the side frame members 30 of the conveyor frame.

The conveyor 12 as a whole is carried on a horizontal shaft 32, and is mounted for tilting movement from its horizontal working position to an approximately vertical position as shown in broken lines in Fig. 1. The shaft 32 is supported on standards 33 mounted on the framework 20. Means for tilting the conveyor comprises a hand wheel 34 (Figs. 3 and 4) on a shaft 35, carrying a worm 36 running in mesh with a worm gear segment 37 bolted to the conveyor frame. The downward tilting movement of the conveyor frame is limited by an adjustable stop 42, screw-threaded into a post 43 supporting the conveyor in its operating position. The motor M¹ which drives the conveyor 12, operates through speed reduction gearing within a gear box 38, and sprocket driving chains 39 and 40, the latter trained over a sprocket gear 41 keyed to the drive shaft 25.

The elevating conveyor 14, which is similar in construction to the receiving conveyor 12, comprises endless conveyor belts 45 spaced horizontally and in line with the conveyor belts 23. The belts 45 are trained over pulleys 46 (Fig. 3) on a drive shaft 47, and pulleys 48 on a driven shaft 49 (Fig. 8) at the upper or discharge end of the conveyor. The belts are supported on underlying sheet metal strips 51 attached to cross-channel bars 52 forming part of the conveyor frame. The motor M² which drives the conveyor 14, operates through speed reduction gearing within a gear box 53 (Figs. 3 and 5) and sprocket gear chains 54 and 55. The chain 54 is trained over a sprocket wheel on a stub shaft 56 mounted in a standard 57, said shaft 56 being in horizontal alignment with the shaft 27 of the receiving conveyor. The chain 55 is trained over a second sprocket wheel on the shaft 56, and a sprocket wheel 58 keyed to the drive shaft 47 of the elevating conveyor. The two sprocket wheels on the stub shaft 56 are connected to rotate as a unit.

The shaft 47 is journaled in rock arms 60 and 61 or hangers which support the receiving end of the elevating conveyor. The arm 60 is journaled at one end on the stub shaft 56 and the arm 61 is likewise journaled at one end on a stub shaft 56′ in alignment with the shaft 27. The drive shaft 47 is journaled in the opposite ends of the rock arms 60, 61. This construction permits the lower or receiving end of the elevating conveyor to swing about the axis of the stub shafts 56 and 56′ during the hoisting and lowering of the conveyor which swings from its lowered or horizontal position to its upward position shown in broken lines on Fig. 5.

Figure 7:
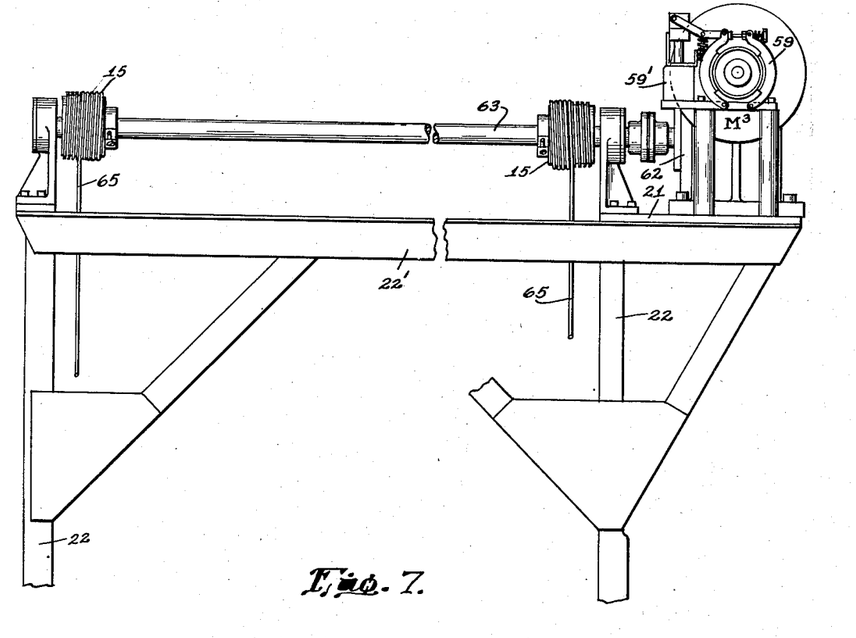
Fig. 7 is a front elevational view of the hoisting mechanism.

The hoisting motor M³ has driving connections with the hoisting drums through speed reduction gearing within a gear box 62 (Figs. 1 and 7), said gearing driving the drum shaft 63 on which the hoisting drums 15 are mounted. Cables 65, wound on the drums, are attached to trunnions 66 or posts, bolted to the side frame members 67 of the elevating conveyor, a short distance from the discharge end of the conveyor. Rollers 68 journaled on the free ends of the trunnions 66 run in vertical guideways formed by guide rails 69 bolted to the upright frame members 22. It will be seen that with this construction the path of up-and-down movement of the discharge end of the conveyor is approximately vertical, thereby permitting the blanks B as they are discharged from the conveyor to be built into substantially vertical stacks 16. The motor M³ is equipped with a brake 59 actuated by an electromagnet 59′ which is deenergized to apply the brake when the motor circuit is opened.

Figure 8:
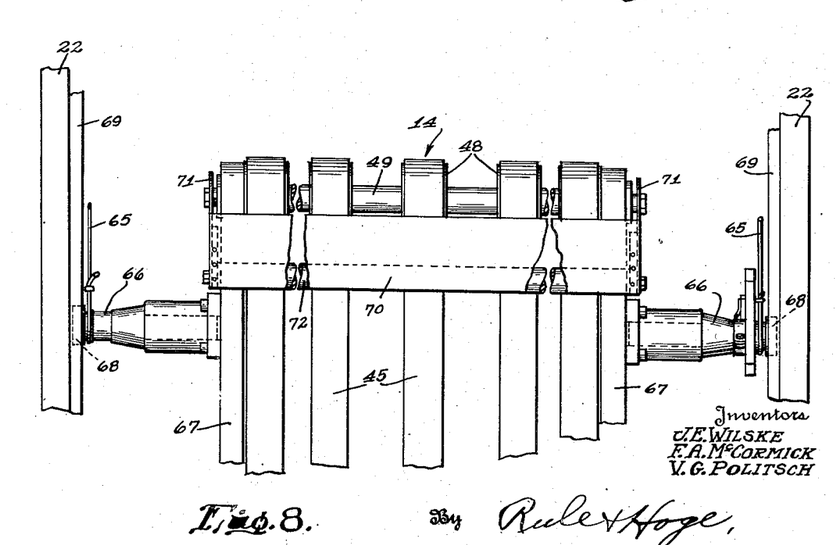
Fig. 8 is a fragmentary elevational view of the upper portion of the elevating conveyor as indicated by the line 8—8 on Fig. 1.

The conveyor 14 is provided at its upper end with a cross bar 70 carried on hangers 71 pivoted to and depending from the conveyor shaft 49. The bar 70 is weighted by a metal rod 72 so that the front face of the bar 70 is maintained in a substantially vertical plane. The bar serves as a guard to prevent the discharged blanks from being carried back beneath the conveyor and also serves as a guiding means by which the blanks are aligned on the stack 16.

Figure 6:
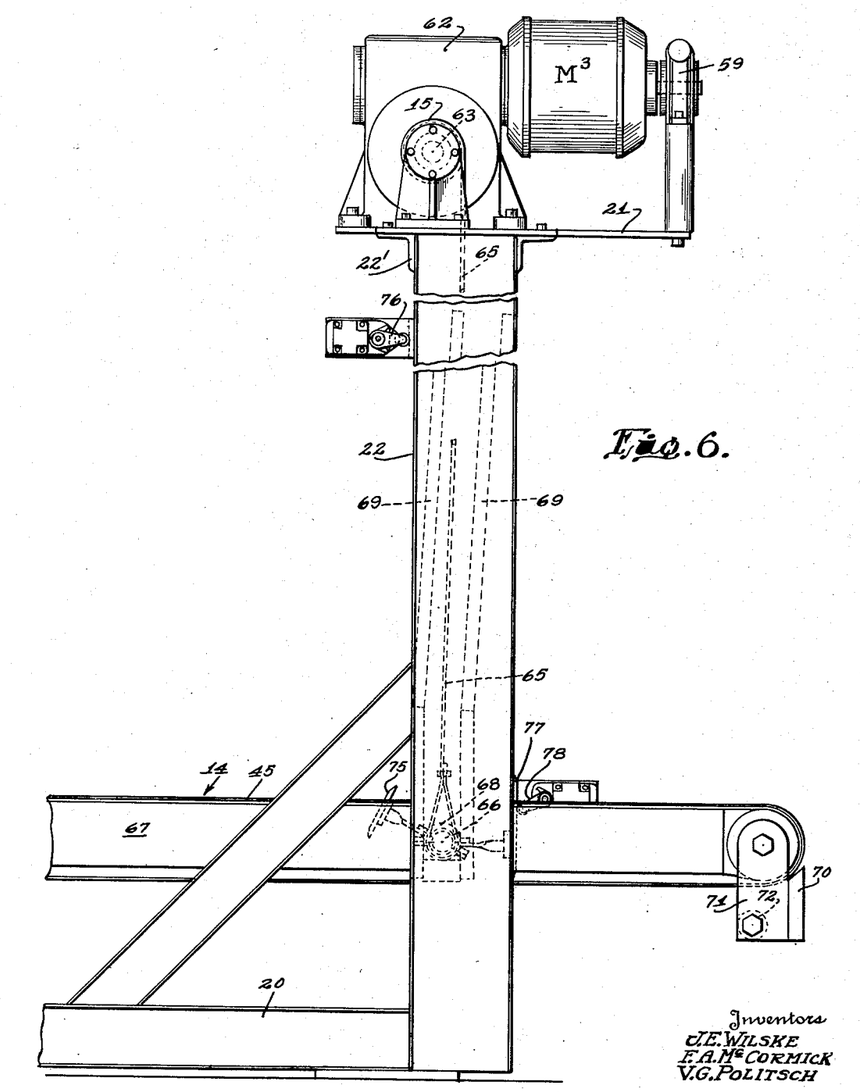
Fig. 6 is an elevational side view of the elevating conveyor and the hoisting mechanism therefor.
Figure 9:
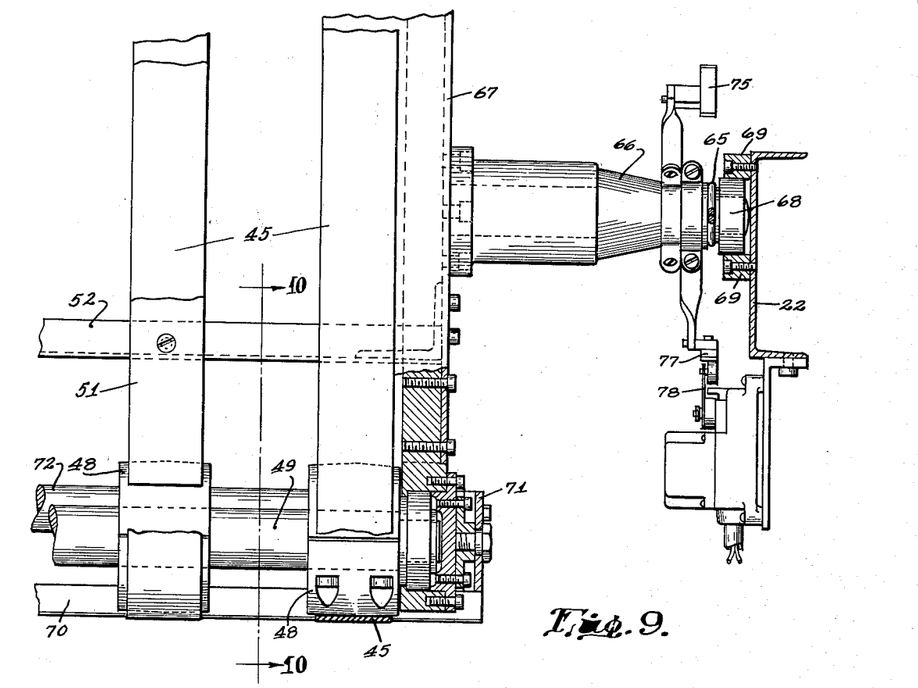
Fig. 9 is a fragmentary part sectional plan view, showing a corner portion of the elevating conveyor and associated parts.
Figure 10:
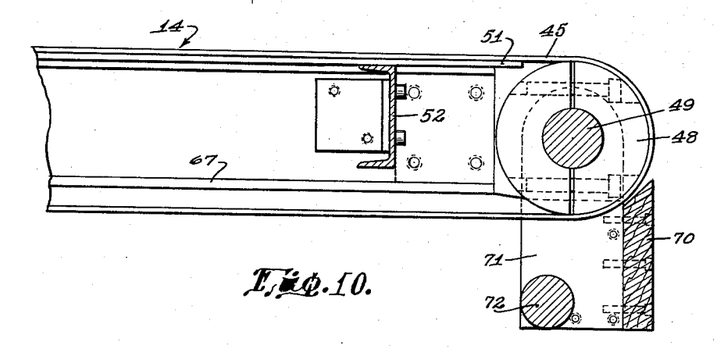
Fig. 10 is a sectional elevation at the line 10—10 on Fig. 9.

The trunnion 66 carries a switch operating cam 75 (Figs. 6 and 9) which actuates an arm 76 of an upper limit switch as the elevator reaches its upper limit of movement, and a cam 77 which actuates an arm 78 of a lower limit switch when the elevator is lowered, as more fully described hereinafter.

The receiving conveyor is provided at its discharge end with a series of guards 80 (Figs. 2 and 3) interposed between the belts 23 and attached to a cross bar 29 of the conveyor frame. These guards extend downward into position to prevent blanks B from slipping or being carried back beneath the conveyor belts.

Referring to the wiring diagram (Fig. 11) the motors and their control devices receive current supplied through the mains, a, b, and c of a three-phase system. The motors are connected directly to the mains. The relay magnet coils receive current through a step-down transformer comprising the primary winding 81 connected to the mains b, c, and a secondary winding 82 to which are connected the lead wires or mains 83 and 84. The motor M¹ is wound for fast and slow speeds, and operates to drive the receiving conveyor at slow speed while the elevating conveyor is being lowered and at full speed while the elevating conveyor belts are running. Electromagnet coils 85 and 86 operate to close the motor switches for fast and slow speed windings respectively. Control devices for the motor M¹ include a push button starting switch 87, a stop switch 88, relay coil 89 for closing a holding circuit, and a relay 90 operative to shift the motor connections from slow speed to fast speed, all as presently described.

Figure 11:
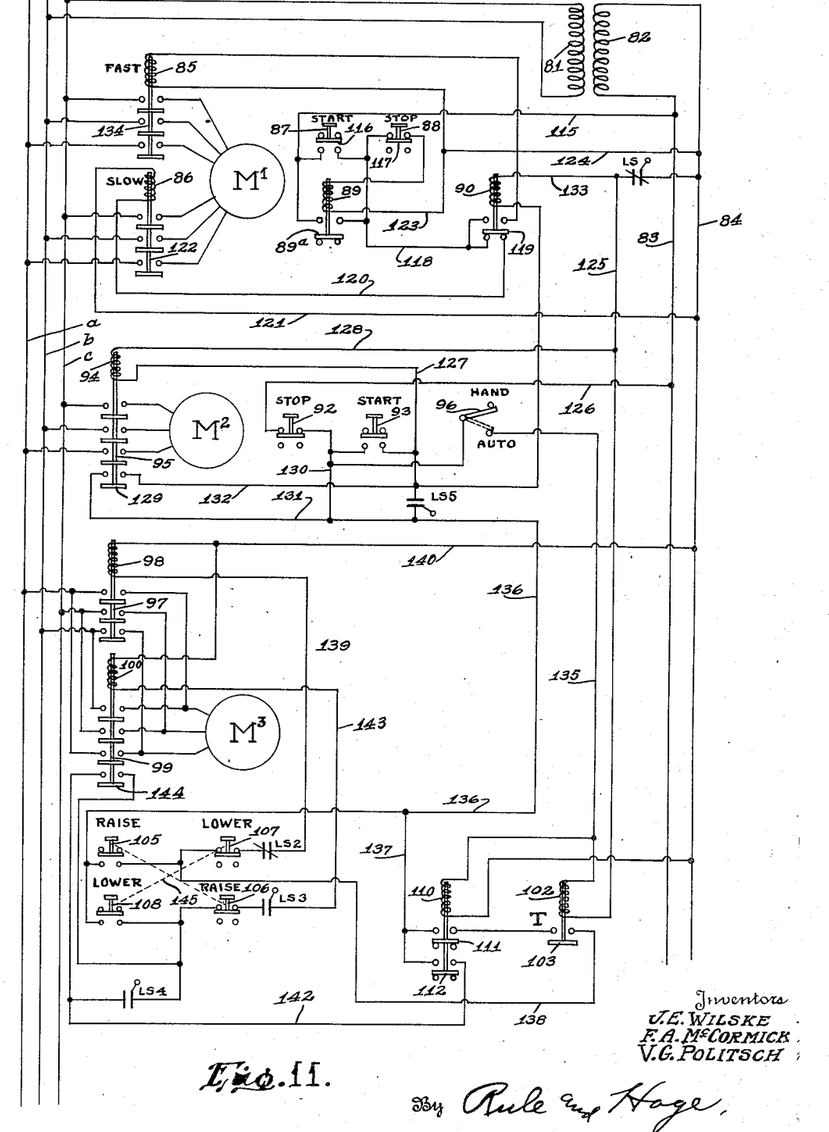
Fig. 11 is a wiring diagram of the electric motors and their controlling mechanism.

Control devices associated with motor M² which drives the elevating conveyor belts include a stop switch 92, starting switch 93, and relay coil 94 for operating the motor switch 95. A selector switch 96 is shiftable from position for manual control to a position for full automatic control of the several motors.

The hoisting motor M³ is reversible. A switch 97 when closed by its relay coil 98, makes a circuit for operating the motor in a direction to hoist the elevating conveyor. A switch 99 and its coil 100 control the current supply for running the motor in the reverse direction. The hoisting movement of the elevating conveyor is under the control of a timer device T including a relay coil 102 and switch 103. The timer operates automatically to cause an intermittent step-by-step upward movement of the discharge end of the conveyor. As the stack 16 of blanks is being built up, the hoisting movement of the conveyor is at a rate such that the discharge end of the conveyor is at all times just above the top level of the stack.

In order to permit manual control of such hoisting movement, there is provided means for inching the conveyor up or down, that is, increasing the rate of upward movement or reversing the movement to correspond to the height of the stack of blanks. Such control devices include push buttons 105 and 106 for raising the conveyor and push buttons 107 and 108 for lowering it in the manner hereinafter described.

*Operation*

The operation is as follows:

Assuming the motors to be at rest and the elevating conveyor 14 in its lowered position and no blanks being fed to the apparatus, the operator first closes the push button starting switch 87. This completes a circuit for starting the motor $M^1$ and running it at slow speed, said circuit may be traced from the transformer main 83 through wire 115, switch contact bar 116, wire 118, contact bar 119, wire 120, relay coil 86, and wire 121 to main 84. The coil 86 being energized, closes the motor switch 122 so that the motor starts and runs the receiving conveyor 12 at slow speed. The closing of the starting switch 87 also completes a circuit for the relay coil 89 which circuit extends through wire 115, contact bars 116, 117, coil 89, wires 123 and 124. The relay coil 89 lifts its contact bar 89a and thereby closes a holding circuit (short circuiting the switch 87).

The operator then presses the push button 93 for starting the motor $M^2$ which drives the elevating conveyor. This completes a circuit which may be traced from the transformer main 83 through wire 126, stop switch 92, starting switch 93, wire 127, coil 94, wires 128, 125 and a limit switch LS to main 84. The coil 94 being energized, closes the motor switch 95 and starts the motor $M^2$. The switch 95 includes a contact bar 129 which closes a holding circuit across the starting switch 93. The contact bar 129 also completes a circuit for the relay 90, which circuit may be traced from main 83 through wire 126, stop switch 92, wires 130, 131, contact bar 129, wire 132, relay coil 90, and wire 133. The relay 90 being energized, operates to change the circuit connections for the motor $M^1$ from slow speed to fast speed. That is, the contact bar 119 being lifted, opens the circuit through the slow speed relay 86 and closes a circuit through the fast speed relay 85 so that the motor switch 122 is opened and the switch 134 is closed, causing the motor to run at high speed. The elevating and receiving conveyors are now both running, the latter at full speed.

The operator next starts the printer 13 (Fig. 1) so that blanks B are delivered onto the conveyor 12. This may be at a rate such that the forward end of each blank is a short distance back of the preceding blank, with each blank overlapping a number of the preceding blanks. As the foremost blanks approach the discharge end of the receiving conveyor, the operator throws the selector switch 96 from the hand control position (shown in full lines) to the automatic control. This completes a circuit through the relay coil 110 and coil 102 of a timer T. This circuit can be traced from the transformer main 83 through wire 126, stop switch 92, selector switch 96, wire 135, and through coils 110 and 102 in parallel to main 84. The relays 110, 102 being energized, close their switches and thereby make a circuit for the relay 98 of the motor switch 97. This circuit extends from main 83 through wire 126, stop switch 92, wires 130, 136, 137, switch contact bars 111, 103, wire 138, switch 107, wire 139, and wire 140. The motor switch 97 is thus closed and the motor $M^3$ starts in the direction for hoisting the discharge end of the elevating conveyor.

As the hoisting operation is necessarily comparatively slow in order to keep the discharge end of the elevating conveyor just above the upper level of the rising stack of blanks, the timer T is employed to effect intermittent operation of the motor $M^3$ during the hoisting operation and permitting continuous running of the motor in the reverse direction while the elevating conveyor is being rapidly lowered. The timer T operates its contact bar 103 intermittently for opening and closing the motor control circuit, the timing (which may be adjustable) being such that the motor only runs for relatively short intervals. The circuit may be closed, for example, for one or two seconds and open for 30 or more seconds. As the timer is a commercial article, known in the art, further illustration is deemed unnecessary. Such a timer, which has been found practical for use with the present invention is the product made by Eagle Signal Corporation, Moline, Illinois, and marketed under the trade name "Flexopulse" process timer.

As the elevating conveyor reaches its upper limit of movement, the limit switches LS and LS2 are automatically opened, and limit switches LS4 and LS3 are closed. The opening of the limit switch LS opens the circuits through the relay 94, coil 102 of the timer T, and relay 90. The opening of a circuit through coil 94 opens the switch 95 and stops the motor $M^2$ thereby stopping the elevating conveyor. The opening of the circuit for the timer coil 101 permits the lowering of the conveyor without interruption by the timer. The opening of the circuit through relay 90 operates to shift the motor $M^1$ from fast speed to slow speed, by opening the circuit for the magnet coil 85 and closing the circuit for the slow speed coil 86.

The opening of the upper limit switch LS2 opens the circuit through the coil 98 of the motor switch 97, thereby opening said switch and stopping the hoisting motor $M^3$. The closing of the limit switches LS4 and LS3 establishes a circuit for the coil 100 of the motor switch 99 so that the motor $M^3$ is started in the direction to lower the elevating conveyor. This circuit for the coil 100 may be traced from the main 83 through wire 126, stop switch 92, wires 130, 136, 137, contact bar 112, wire 142, limit switch LS4, switch 106, limit switch LS3, wire 143, coil 100, and wire 140. The limit switch LS, closes as soon as the elevating conveyor starts downward, being held open only while the conveyor is at its uppermost position. The limit switch LS4 is only held closed momentarily, while the conveyor is in its upper postion, to permit a circuit to be made through the relay 100 for closing the switch 99 and starting the hoisting motor $M^3$ in the direction for lowering the conveyor. When the motor switch 99 is thus closed, a contact bar 144 carried on the switch closes a holding circuit connected across the limit switch LS4, permitting continued operation of the motor after the limit switch LS4 opens.

As the elevating conveyor is completing its downward movement the limit switch LS3 opens, thereby breaking the circuit through the coil 100 and opening the switch 99 to stop the motor $M^3$. A limit switch LS5 connected between wires 131 and 132 leading from the contact bar 129, is closed as the elevating conveyor completes its downward movement, and thereby completes the circuits open at said contact bar 129, namely, the circuits through the motor switch coil 94, the timer T, and the relay 90. The circuit for the coil 94 being thus closed, the switch 95 is closed and the motor M² and elevating conveyor. The circuit established through the relay 90 as above noted, lifts the contact bar 119 and thereby shifts the motor M¹ from slow to fast speed. This completes the cycle of operations initiated manually by operating the starting switch 87 and thereafter shifting the selector switch to automatic control. The apparatus will continue to operate automatically until stopped by the operator.

During the automatic operation it is possible for the operator to effect any of the following adjustments and controlling operations manually. While the stack of blanks is being built, he may "inch" the elevating conveyor upwardly by pressing the push button switch 105. This switch is interconnected with the switch 106 by a connection indicated by broken line 145 so that said switches move upward and downward together. The switches 107 and 108 are interconnected in like manner. When the switch 105 is closed, it short circuits the open switch 103 of the timer T and thus permits the hoisting motor M³ to run continuously until the push button switch 105 is released. The elevating conveyor may be inched downward by pressing the "lower" push button 107 while the hoisting motor M³ is running in the direction for hoisting the conveyor. This opens the circuit through the motor switch relay 98 and thereby stops the motor M³, and at the same time closes the circuit for the motor control magnet 100 so that the switch 99 closes and starts the motor M³ in the reverse direction, thereby lowering the conveyor. By such up and down inching movements the height of the elevating conveyor may be adjusted at any time to correspond with the height of the stack 16 at the time.

To stop the elevating conveyor, the operator presses the stop button 92. This opens the circuit through the relay 94 so that the motor switch 95 is opened and the motor M² stopped. The holding circuit for the "start" switch 93 is also opened at the contact bar 129. The pressing of the "stop" button 92 also opens the circuits through the relays 110 and 102 which then open their switches and thereby open the circuit through the motor switch relay 98 so that the hoisting motor M³ is stopped. The motor M³ may be stopped independently of the elevating conveyor motor M² by shifting the selector switch 96 from automatic to hand control. This opens the circuits through the relay coils 110 and 102 which operates to stop the motor M³ as just described. By shifting the selector switch 96 back to automatic, the hoisting motor M³ is again started.

To stop all operations, the operator pushes the two stop push buttons 88 and 92 and turns the selector switch 96 to hand control.

Modifications may be resorted to within the spirit and scope of our invention.

We claim:

1. Apparatus for receiving, conveying, elevating, and stacking blanks, said apparatus comprising a receiving conveyor including horizontally disposed endless travelling belts, an elevating conveyor comprising endless travelling conveyor belts, said elevating conveyor having its receiving end adjacent to the discharge end of the receiving conveyor, the discharge end of the elevating conveyor being mounted for up and down movement, a motor geared to the receiving conveyor, a second motor geared to the elevating conveyor, a hoisting motor, operating connections between the hoisting motor and the elevating conveyor for moving the discharge end of the elevating conveyor upwardly as blanks are delivered therefrom and for lowering the conveyor when a stack of the blanks has been built up, and automatic control devices controlling the operation of said motors, said control devices including means for periodically reversing the hoisting motor and thereby lifting and lowering the elevating conveyor, means for stopping said second motor and the elevating conveyor belts during the lowering of the elevating conveyor, and means for reducing the speed of the first mentioned motor and running the receiving conveyor at a reduced speed during the lowering of the elevating conveyor.

2. Apparatus for conveying and elevating blanks, comprising a horizontally disposed receiving conveyor including parallel horizontally spaced endless conveyor belts, pulleys at the discharge end of the receiving conveyor over which the belts are trained, a shaft on which said pulleys are mounted, an elevating conveyor comprising parallel spaced endless conveyor belts in line with said first mentioned belts, the elevating conveyor being upwardly and forwardly inclined and having its receiving end positioned below the discharge end of the receiving conveyor, and guards mounted on the receiving conveyor frame, said guards being interposed between the receiving conveyor belts and located entirely below the plane of the forwardly traveling stretches of the receiving conveyor belts, said guards extending forwardly over the said shaft to a position directly over the receiving end portion of the elevating conveyor and thence downwardly between the conveyor belts of the elevating conveyor.

3. Apparatus for conveying and stacking blanks, comprising a receiving conveyor, an elevating conveyor mounted in advance of the receiving conveyor in such a manner that the receiving end of the elevating conveyor may swing about a horizontal axis, electric motors including a two-speed motor geared to the receiving conveyor, a second motor geared to the elevating conveyor, a hoisting motor, operating connections between the hoisting motor and the elevating conveyor for elevating the discharge end of the conveyor, automatic control mechanism for the motors, including means for periodically shifting the two-speed motor from fast to slow speed and after a time interval shifting it again to fast speed, said control mechanism including means for stopping the second motor when the first motor is shifted to slow speed and for starting the second motor when the first motor is returned to fast speed, said control mechanism including means for periodically reversing the hoisting motor, running it in a direction to lower the elevating conveyor while the second motor is at rest and for again reversing the hoisting motor when the second motor is started, the receiving end of the elevating conveyor being swung about a horizontal axis when the discharge end of said conveyor is lifted or lowered.

4. The apparatus defined in claim 3 including manual control means by which the discharge end of the elevating conveyor may be inched up or down relatively to its normal upward movement by the hoisting motor.

5. Apparatus for conveying and stacking blanks comprising a receiving conveyor, an elevating conveyor mounted in advance of the receiving conveyor in such a manner that the receiving end of the elevating conveyor may swing about a horizontal axis, electric motors including a two-speed motor geared to the receiving conveyor, a second motor geared to the elevating conveyor, a hoisting motor, operating connections between the hoisting motor and the elevating conveyor for elevating the discharge end of the conveyor, and automatic control mechanism for the motors, including means for periodically shifting the two-speed motor from fast to slow speed, and after a time interval shifting it again to fast speed, said control mechanism including means for stopping the second motor when the first motor is shifted to slow speed and for starting the second motor when the first motor is returned to fast speed, said control mechanism including means for periodically reversing the hoisting motor and running it in a direction to lower the elevating conveyor while the second motor is at rest and for again reversing the hoisting motor when the second motor is started, a selector switch in the control circuits of the motors and operable to shift the motors from automatic to manual control, and stop and start the hoisting motor the receiving end of the elevating conveyor being swung about a horizontal axis when the discharge end of said conveyor is lifted or lowered.

6. Apparatus for receiving, conveying, elevating, and stacking blanks, comprising a receiving conveyor, a two-speed electric motor geared to the conveyor, an elevating conveyor positioned to receive blanks from the receiving conveyor, a second electric motor geared to the elevating conveyor, said elevating conveyor mounted for up and down swinging movement for raising the discharge end thereof as blanks are delivered therefrom and accumulated to form a stack and then lowering said discharge end, an electric hoisting motor geared to the elevating conveyor for raising and lowering said discharge end, automatic control devices for the motors, comprising upper limit switches actuated as the elevating conveyor reaches its upper position and operable to reduce the speed of the two-speed motor, stop the said second motor and reverse the hoisting motor and thereby cause the elevating conveyor to be lowered, said control mechanism including means for again reversing the hoisting motor when the elevating conveyor reaches its lowered position, starting said second motor and shifting the two-speed motor from low speed to high speed.

7. Apparatus for conveying, elevating and stacking blanks, comprising a receiving conveyor including an endless traveling belt, an elevating conveyor including an endless traveling belt in line with the receiving conveyor belt, the elevating conveyor comprising a frame, means for mounting said frame for combined up-and-down swinging movement about the receiving end thereof as an axis and movement bodily in the direction of its length, automatic means for lifting the discharge end of the elevating conveyor as the blanks are being discharged therefrom, means for guiding said discharge end of the conveyor in a substantially vertical direction during said lifting movement, the elevating conveyor including a roll at the discharge end thereof over which the elevating conveyor belt runs, hangers pivoted to swing about the axis of said roll, a weighted bar carried by said hangers to swing therewith and having a front face extending into close proximity the portion of the elevating conveyor belt running over said roll and held by gravity in a substantially vertical plane throughout the lifting movement of the elevating conveyor, thereby preventing the discharged blanks from being carried back under the conveyor and guiding the blanks into alignment in a stack.

JULIUS E. WILSKE.
FRANCIS A. McCORMICK.
VERNEY G. POLITSCH.

References Cited in the file of this patent

UNITED STATES PATENTS

| Number | Name | Date |
|---|---|---|
| 733,385 | Goldsmith | July 14, 1903 |
| 849,577 | Sebrell | Apr. 9, 1907 |
| 1,141,277 | Smith | June 1, 1915 |
| 1,389,244 | Free | Aug. 30, 1921 |
| 1,767,442 | Evans et al. | June 24, 1930 |
| 1,891,782 | Sager | Dec. 30, 1932 |
| 1,913,533 | Brunner | June 13, 1933 |
| 2,314,431 | Strike | Mar. 23, 1943 |
| 2,371,956 | Dees | Mar. 20, 1945 |
| 2,372,130 | Smith | Mar. 20, 1945 |
| 2,422,268 | Symonds | June 17, 1947 |
| 2,477,830 | Sandberg | Aug. 2, 1949 |